United States Patent [19]
Rudd

[11] 3,851,139

[45] Nov. 26, 1974

[54] MAGNETIC PULSE WELDING USING SPACED PROXIMITY CONDUCTOR

[75] Inventor: Wallace C. Rudd, Larchmont, N.Y.

[73] Assignee: Thermatool Corp., Stamford, Conn.

[22] Filed: Dec. 6, 1973

[21] Appl. No.: 422,347

Related U.S. Application Data

[63] Continuation-in-part of Ser. No. 159,277, July 2, 1971, Pat. No. 3,794,805.

[52] U.S. Cl.................... 219/101, 219/59, 219/149
[51] Int. Cl............................................ B23k 11/02
[58] Field of Search............ 219/149, 101, 7.5, 153, 219/59, 8.5

[56] References Cited
UNITED STATES PATENTS

| | | | |
|---|---|---|---|
| 2,066,668 | 1/1937 | Bennett............................ | 219/8.5 X |
| 2,846,554 | 8/1958 | Baffrey et al...................... | 219/8.5 |
| 2,976,907 | 3/1961 | Harvey et al....................... | 219/153 |
| 3,004,136 | 10/1961 | Peterson........................... | 219/59 X |
| 3,088,200 | 5/1963 | Birdsall et al..................... | 219/149 X |
| 3,092,165 | 6/1963 | Harvey............................. | 219/8.5 X |
| 3,115,857 | 12/1963 | Pfanner............................. | 219/153 |
| 3,126,937 | 3/1964 | Brower et al....................... | 219/7.5 |
| 3,171,014 | 2/1965 | Ducati.............................. | 219/149 |

Primary Examiner—C. L. Albritton
Assistant Examiner—Kenneth W. Hairston
Attorney, Agent, or Firm—Brooks Haidt & Haffner

[57] ABSTRACT

Method and apparatus for forge welding together a pair of electrically conductive workpieces. Heating of the portions of the workpieces to be welded together to an elevated forge welding temperature is produced by means of a proximity conductor which is positioned closely adjacent such portions and which is conductively connected in electrical series with such portions and forge welding pressure is applied to the portions to weld them together after they have been heated by causing a large magnitude current pulse to flow through the same proximity conductor-workpiece circuit.

13 Claims, 19 Drawing Figures

MAGNETIC PULSE WELDING USING SPACED PROXIMITY CONDUCTOR

This application is a continuation-in-part of my co-pending application Ser. No. 159,277, filed July 2, 1971 and entitled "MAGNETIC PULSE FORMING, WELDING AND CUTTING" now U.S. Pat. No. 3,794,805.

BACKGROUND OF THE INVENTION

In my copending application Ser. No. 938, filed Jan. 6, 1970, entitled "WELDING BY HIGH FREQUENCY CURRENT PENETRATION" and now U.S. Pat. No. 3,591,757, I disclose a method and apparatus for high frequency electrical resistance welding in which welding current is conducted through the portions of lapped workpieces to be welded in a continuous circuit which includes a proximity conductor that is positioned closely adjacent the portions of the workpieces to be heated to welding temperature. Current flows in the workpieces in the direction opposite to the direction of current flow in the proximity conductor. By making use of the proximity effect and the skin effect I am able to control the welding current so as to provide a useful welding method and apparatus. In that method of welding, some form of pressure must be applied to the workpieces to forge weld them after they have been heated. The pressure is applied by some type of hammer or moving anvil which physically strikes or somehow physically contacts the workpieces after they have been heated. Because the proximity conductor is positioned immediately adjacent the heated portions of the workpieces, it often must be moved out of the way or the workpieces must be moved before forging pressure can be applied. To accomplish either of these, relative complex mechanical and electrical apparatus must be provided. Often some time delay is experienced while mechanical operations are performed to apply forging pressure. This results in undesired heat loss in the workpieces.

It is known in the art to form and weld metal workpieces by a process which has come to be known pulsed magnetic forming and welding. The manner in which this process is practiced to form an indentation in an electrically conductive tube, for example, is to place the tube within and electrically insulated from a solenoid and then pass a short duration, large magnitude current pulse through the solenoid. The pulse of current which flows in a first direction in the solenoid induces a pulse of current which flows in the opposite direction about the circumference of the portion of the tube that is within the solenoid. Magnetic fields associated with the currents interact with the currents to produce a force which acts radially inwardly about the circumference of the tube to reduce its diameter.

It also has been proposed to place a flat helical coil about and electrically insulated from the surface of a conductive sheet of metal which is in contact with a die or template. A pulse of current is passed through the flat coil and the accompanying pulse of magnetic pressure which acts on the surface of the conductive sheet forces the sheet onto the die to form the sheet in a desired shape.

Pipe ends may be lap welded by placing the ends in telescoping contact within an encircling solenoid. A pulse of current passed through the solenoid produces a pulse of radially directed magnetic pressure which forces the pipe walls together to form a joint or a weld.

To improve the working conditions of the metal workpiece for forming, and to heat the workpieces for welding, it is known to first pass a continuous heating current through the solenoid or flat coil, then disconnect the heating current and immediately switch a current pulse to the solenoid or flat coil to produce the pulse of magnetic pressure which then forms, or welds, the workpieces which have been heated.

The above-described processes of magnetic pulse forming and welding have been used successfully, but because they require an encircling coil, which may be a single turn or multiple turns, or a flat helical coil, the physical geometry of the induction coils has restricted the use of the processes to a limited number of types of workpieces. In practice, the described processes have found little use except with tubular workpieces.

In further considering the deficiences of the described magnetic pulse forming and welding processes it is recognized that inductive coupling of current to a workpiece inherently is less efficient than direct conductive connection of a current to a workpiece. Therefore, in the process described, there is less current in the workpiece than in the primary circuit which includes the solenoid and its pulsed current source. This results in a pulsed magnetic pressure of lesser magnitude than would be produced if the same current that flows from the primary current source also were available in the workpiece.

In welding workpieces such as flat sheets or plates it usually is desired to heat only edge portions or narrow linearly extending regions of the workpieces, but because inductively coupled current must flow in the workpieces in a closed loop, the narrow linear regions of the workpieces to be heated will compromise but a portion of the closed loop. The result is that current flowing in the remainder of the loop gives rise to current losses, thereby reducing the efficiency of the system.

One proposal for magnetic pulse welding of two metal sheets or plates that are in lapped relationships is to place the lapped sheets between the two conductors of a hair-pin shaped, or U-shaped, induction coil. A high frequency heating current is passed through the induction coil to inductively heat the lapped sheets, and then a short duration current pulse is passed through the coil to produce a pulse of magnetic pressure which forces the heated lapped edges together to form a weld joint. In this arrangement the induced current in the edges of the sheets flows in a closed loop which runs around the periphery of the lapped sheets, when looking at a transverse cross-sectional view of the sheets at the lapped regions. That is, the current flows in one direction transversely across the top sheet, down along the sides of the two sheets, then transversely across the bottom sheet and then up the opposite sides of the sheets to the top sheet. The current flow across the top and bottom sheets is in opposite direction. The depth of penetration of the current into the top and bottom sheets is a function of several parameters which includes the frequency of the current, the magnetic properties of the metal, resistivity, and the temperature of the metal. As the metal heats, the current will penetrate further into the interior of the sheets. When the sheets are thin, and particularly when they are at elevated temperatures, the depth of penetration of the current into the top and bottom sheets will be great enough that current flowing across the top sheet will tend to penetrate into the bottom sheet and vice versa. That is, at the contacting surfaces of the sheets, current will be attempting to flow in opposite directions. The result will be a cancellation of current at and adjacent the contacting surfaces. But, these are the regions that are to be heated to the highest temperatures in order to produce a good weld. Therefore, either a poor weld will be formed, or a long heating time will be required, and/or an excessively large power source will be required.

SUMMARY OF THE INVENTION

In the present invention I provide a method and apparatus for welding in which the described limitations of the prior art are overcome by the use of simple and efficient apparatus. I am able to eliminate both the undesirable consequences resulting from the use of mechanical means for applying pressure, and the undesirable consequences and limitations inherent in the known methods of magnetic pulse welding and forming.

In this invention both the source of heating current and the source of pulsed current which produces pulses of magnetic pressure are directly connected to the workpiece or workpieces by current conductors. One of the conductors is a proximity conductor which is disposed in closely spaced and electrically insulated relationship to the path of current flow in the workpiece or workpieces. With this arrangement, an efficient electrical system is provided and current flows only through the portions of the workpieces to be formed or welded. Because of the simple and direct connection of current pulses to the circuit which includes the workpiece and the closely adjacent proximity conductor, optimum magnetic pressure or force is produced by the pulse of current. The mechanical and electrical apparatus is adapted for use with a variety of workpieces, and although such apparatus permits a variety of different work functions to be performed as described in said copending application, the apparatus constructed and operated according to the teachings of this invention is to be used for forge welding.

DESCRIPTION OF PREFERRED EMBODIMENTS

Figure 1:
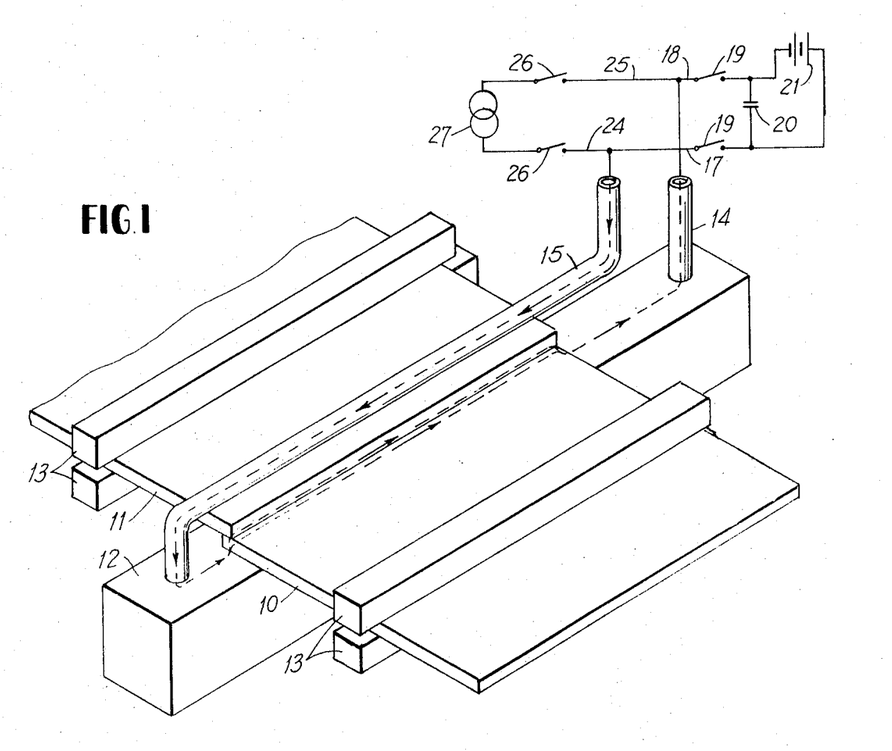
FIGS. 1 and 2 illustrate a method and apparatus for lap welding workpieces in accordance with the present invention.

FIG. 1 is a simplified illustration of apparatus for the magnetic pulse welding of lapped edges of two electrically conductive metal sheets or plates 10 and 11. The end of bottom sheet 10 rests on an anvil or backing member 12 which is made of a conductive metal such as copper and which has good impact resistance without deforming. Sheets 10 and 11 are physically supported by bars 13. Any suitable supporting means may be used. Two electrical conductors 14 and 15 are in direct and continuous electrical contact with anvil 12 on opposite sides of sheets 10 and 11. Conductor 15 passes transversely across and is slightly spaced from the top of sheet 11. Conductor 15 is disposed directly above the overlapped portions of sheets 10 and 11 which are to be welded.

Conductors 14 and 15 are connected by means of leads 17 and 18 and switch 19 to a large storage capacitor 20. Capacitor 20 is connected to a source of d.c. charging current 21. Conductors 14 and 15 also are connected by leads 24 and 25, and by switch 26, to a source of high frequency welding current 27 which may have a frequency ranging from approximately 3 kilohertz to 450 kilohertz, for example.

In the operation of the apparatus of FIG. 1 to weld the lapped ends of sheets 10 and 11, switch 19 first is opened and switch 26 is closed. Capacitor 20 will be charged by d.c. source 21. High frequency welding current will be coupled from high frequency source 27, through switch 26, through leads 24 and 25 to conductors 14 and 15. For an assumed direction of current flow, current will flow in a path through conductor 15 to anvil 12, then, due to skin effect and to the proximity effect produced by proximity conductor 15, current will flow up into and across a transverse path in both of the lapped portions of sheets 10 and 11 to the right side of anvil 12. The current then will flow through conductor 14, lead 25, through switch 26 back to source 27. As mentioned above, the combination of skin effect and proximity effect will cause the current to flow in the overlapped ends of sheets 10 and 11 directly under proximity conductor 15. The parameters of the electrical system may be so selected relative to the characteristics of the metal of sheets 10 and 11 that practically all of the heating current will flow in sheets 10 and 11 and very little in the portion of anvil 12 which supports sheet 10. For further explanation of the control of the depth of current penetration into workpieces, reference is made to my above-mentioned application.

After welding current has heated the overlapped portions of sheets 10 and 11 to their desired welding condition, which may be their plastic state, switch 26 is opened and switch 19 is closed. Suitable electronic and/or mechanical switching means may be employed for performing the required switching functions. Charged capacitor 20 now is directly connected to conductors 14 and 15 and the stored charge produces a large magnitude, short duration current pulse which flows to conductor 15, through the left portion of anvil 12, then preferably through only the overlapped portion of top sheet 11, through the right portion of anvil 12 to conductor 14 and back to capacitor 20.

The direction of current flow through proximity conductor 15 is opposite to the current flow through the sheet 11, and the high magnitude, short duration pulse produces a strong magnetic field around both of those portions of the current path. Therefore, the requisite conditions for magnetic pulse welding are present. The interaction between the current and magnetic fields causes a pulse of magnetic pressure to be exerted downwardly onto the heated overlapped portions of sheets 10 and 11 to force them together in a forging-type action to form the desired weld.

As mentioned above it is desired that the pulse of current flow through the overlapped portion of sheet 11 rather than through both sheets. The reason for this is that it is desired to have as much pressure as possible forcing sheet 11 onto sheet 10. Because a short duration current pulse having a sharply rising leading edge is rich in high frequency components, skin effect will cause the current pulse to flow near the surface of a conductor, and the proximity effect will cause it to flow in a path close to proximity conductor 15. Thus, with short pulses the current can be made to preferentially flow in sheet 11. This is not absolutely necessary to obtain satisfactory welds, but will produce optimum welds.

Figure 2:
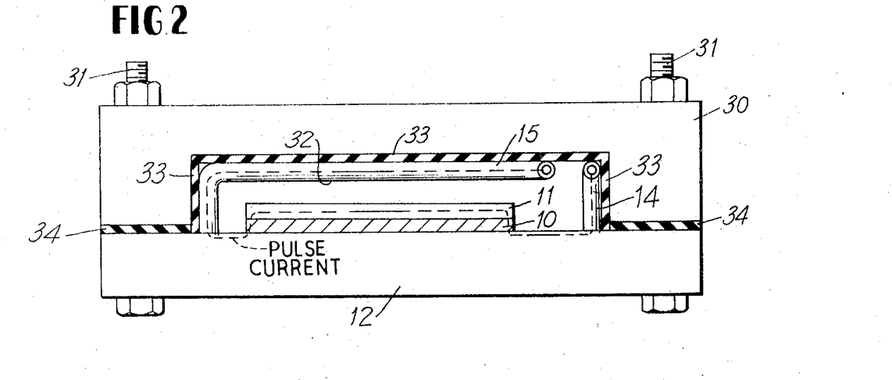

In addition to the force applied to the workpieces by the pulse of magnetic pressure, a reaction force also is applied to proximity conductor 15 which tends to move it away from the current path in the workpieces. A backing means therefore is required to maintain proximity conductor 15 in place. Such a structure is illustrated in FIG. 2 which shows the lapped sheets 10 and 11 supported on anvil 12, and the conductors 14 and 15 connected to anvil 12. A backing member 30 is secured to anvil 12 by means such as bolts 31 which extend through both members. Backing member 30 has a recessed portion 32 within which is located the proximity conductor 15. Electrical insulating material 33 insulates proximity conductor 15 from backing member 30. Electrical insulating material 34 also isolates anvil 12 from backing member 30. In order for the conductors 14 and 15 to clear the backing member 30, they will bend horizontally out of the recessed region 32. In the manner illustrated, backing support is provided for proximity conductor 15.

Because the current pulse which flows in the circuit must have a sharply rising leading edge, the backing member for proximity conductor 15 should not inductively load the electrical circuit. Preferably it is made of non-magnetic material.

Support also must be provided for anvil 12. Any suitable type of supporting structure may be employed.

Although it often is desirable to first heat the portion of the workpieces to their plastic state before the pulse of magnetic pressure is applied, it may be desirable to eliminate the heating and simply forge weld the workpieces by applying only the magnetic pulse as described in said copending application. One or a succession of pulses may be applied to the workpieces to forge weld them. Of course, a current pulse itself will generate some heat in the workpieces.

From the above description it is seen that sheets 10 and 11 have been forge welded in a simple and fast operation without the need for complex apparatus which otherwise would be required to provide a mechanical hammer or other type of physical tool to forge weld the overlapped sheets. Furthermore, the forging pressure is applied at the same location where the sheets are heated so that there is no heat loss experienced as would be the case if the sheets had to be moved to a different position to receive a physical hammer blow.

Figures 3, 5:
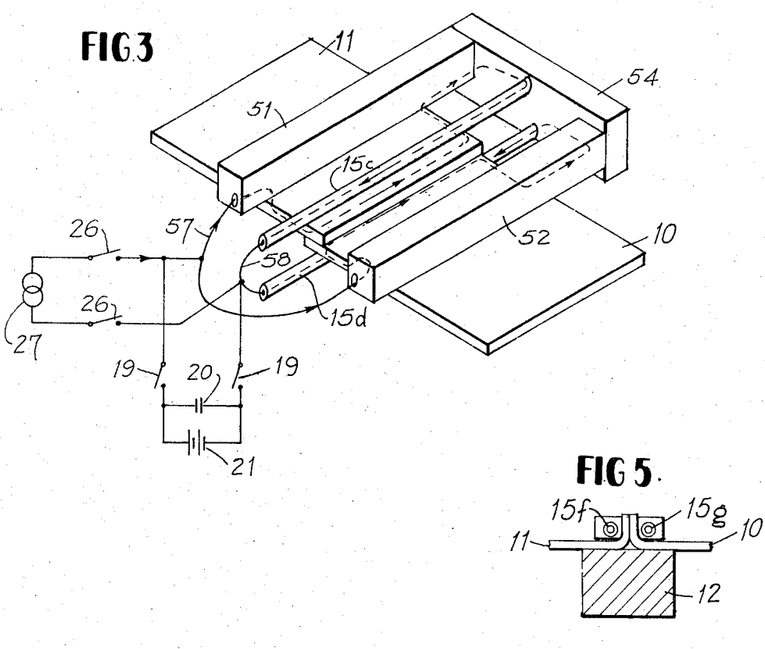
FIGS. 3-5 illustrate an alternative arrangement for welding workpieces by employing a pair of proximity conductors.

In the previously described embodiment of the invention the workpiece or workpieces which were subjected to the force of the magnetic pulse rested on a conductive anvil. FIG. 3 illustrates apparatus for lap welding two sheets, but instead of using an anvil 12 as in FIG. 1, a reaction force is provided by the use of a second proximity conductor which is positioned on the side of the workpieces opposite from the first proximity conductor. Electrically conductive metal sheets 10 and 11 are in overlapping contact at their end regions, and electrically conductive bars 51 and 52 extend transversely across and are in electrical contact with sheets 11 and 10, respectively. An electrically conductive jumper bar 54 connects bars 51 and 52 at their right ends. Two proximity conductors 15c and 15d are in direct conductive contact with jumper bar 54 and extend transversely above and below the lapped ends of sheets 10 and 11.

Considering now the electrical connections to the apparatus of FIG. 3, the left ends of conductive bars 51 and 52 are connected in parallel by lead 57, and the left ends of proximity conductors 15c and 15d are connected in parallel by lead 58. High frequency heating current source 27 is connected through switch 26 to the respective parallel connector leads 57 and 58. Storage capacitor 20 is connected through switch 19 to the parallel connector leads 57 and 58.

With switch 26 closed and switch 19 open welding current will flow in the path indicated on the drawing by the broken lines. Current from the top terminal of high frequency source 27 will flow to parallel connector lead 57 where it divides equally and flows in parallel to the left ends of bars 51 and 52. Due to the proximity effect exhibited by the high frequency current, it will flow from the respective conductor bars 51 and 52 to and along the left side regions of sheets 10 and 11 to the overlapped portions of the sheets. Current then will flow transversely across the respective overlapped portions of the two sheets to the right sides of those sheets. The parallel branches of the current path then turn and follow the right sides of the sheets back to conductor bats 51 and 52. The respective parallel branches of the current path continue to the right ends of bars 51 and 52 and cross over to the center region of jumper bar 54. The current path continues from right to left in parallel branches through proximity conductors 15c and 15d and then to parallel connector lead 58, through the bottom portion of switch 26 to source 27. After the welding current has heated the overlapped ends of sheets 10 and 11 to welding temperature, switch 26 is opened and switch 19 is closed.

Because capacitor 20 also is connected, through switch 19, to the parallel connector leads 57 and 58, a pulse of current which flows from capacitor 20 when switch 19 is closed will follow the same paths as just described and as illustrated in FIG. 3. It may be seen that the direction of current flow in the top proximity conductor 15c is opposite to the direction of current flow across the overlapped end of top sheet 11, and similarly, the direction of current flow in the bottom proximity conductor 15d is opposite to the direction of current flow across the overlapped end of bottom sheet 10. Therefore, the requisite conditions are present for the generation of two simultaneously occurring pulses of magnetic pressure which act, respectively, downwardly on the top surface of sheet 11 and upwardly against the bottom surface of sheet 10. The overlapped ends of sheets 10 and 11 therefore experience forging pressures from the top and from the bottom and no anvil is required.

The magnetic pressures exerted against the top and bottom surfaces of overlapped sheets 10 and 11 should be substantially equal so that there is no up or down displacement of the sheets when the pulses of magnetic pressure act upon them. This requires that the parallel branches of the current path have substantially identical electrical characteristics so that equal currents will flow through proximity conductors 15c and 15d and through overlapped edges of sheets 10 and 11. It is to be understood that suitable backing means are to be provided for proximity conductors 15c and 15d.

In the embodiment of FIG. 3, conductor bars 51 and 52 also may serve as physical support for sheets 10 and 11. Other support means will be located below bars 51 and 52, but have been omitted from the drawing in order to simplify the presentation of the inventive aspects.

Although the overlapping ends of sheets 10 and 11 are illustrated in FIG. 3 as being in contacting relationship, they may be slightly spaced in a vertical direction if desired. The electrical circuits will be precisely the same as described in connection with FIG. 3 and the spaced, overlapped ends will be forced together to form a lap weld upon application of the current pulse from capacitor 20.

Figure 4:
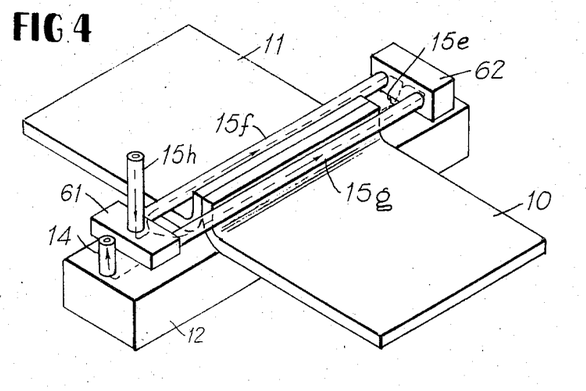

Twin proximity conductors for providing pulses of magnetic pressure to workpieces may be used in an arrangement illustrated in FIG. 4 and 5 to produce a lip weld between the upturned ends of sheets 10 and 11. Sheets 10 and 11 are supported by suitable means, not illustrated, in conductive contact with anvil 12. Conductor 14 also is in conductive contact with anvil 12 as is short conductor 15e of the proximity conductor means. Conductors 15f and 15g are electrically connected in parallel by connector blocks 61 and 62 and are disposed on opposite sides of the upturned ends of sheets 10 and 11. Conductors 14 and 15h are to be connected to a high frequency current source and to a source of pulsed current such as illustrated in FIGS. 1 and 3.

The current path in the structure of FIG. 4 will be through conductor 14 to anvil 12, then along the anvil to the sheets 10 and 11. Due to skin effect and proximity effect, the current will flow across the upturned contacting lips of sheets 10 and 11 at narrow transverse regions adjacent proximity conductors 15f and 15g. At the right edges of sheets 10 and 11 the current will return to anvil 12 and then will flow through short conductor 15e into connector block 62. The current then will divide into parallel paths and will flow through proximity conductors 15f and 15g to connector block 61, through conductor 15h, and then to its source.

Since the upturned edges of sheets 10 and 11 are to be first heated, a high frequency current source will be connected to conductors 14 and 15h, and then the source of pulsed current will be connected to those conductors. The pulses of magnetic pressure produced by the pulsed current flowing through proximity conductors 15f and 15g, and through the upturned edges, will generate magnetic pulse forging pressure acting inwardly against the upturned portion of each sheet to forge weld the ends of the sheets.

Figure 6:
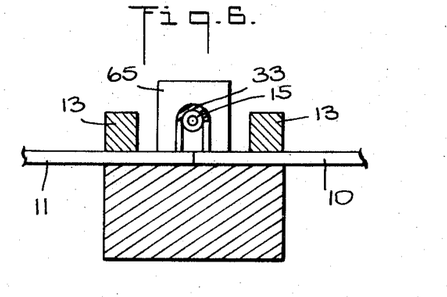
FIGS. 6-9 illustrate butt welding of metal plates by employing the principles of this invention.

Butt welds also may be made in accordance with the teachings of this invention. FIG. 6 is a cross-sectional view of apparatus somewhat similar to FIG. 1 except that metal plates 10 and 11 are in butting contact. Bars 13 support plates 10 and 11 on anvil 12 and a backing member 65, similar to member 30 of FIG. 2, provides support for proximity conductor 15 against the force of the magnetic pulse. The electrical connections to the apparatus will be as illustrated in FIG. 1.

Figure 7:
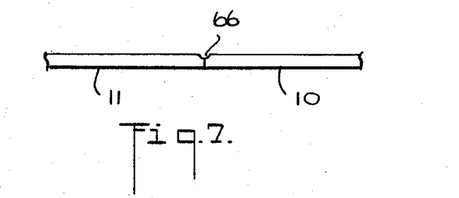

Heating current applied to the apparatus of FIG. 6 will flow in the butting edges of plates 10 and 11 immediately below proximity conductor 15. Upon termination of the heating current and upon application of the large magnitude current pulse, the accompanying pulse of magnetic pressure on the heated butting edges of plates 10 and 11 will impart a dent 66, FIG. 7, into the butting edges and forge weld them together.

Figure 8:
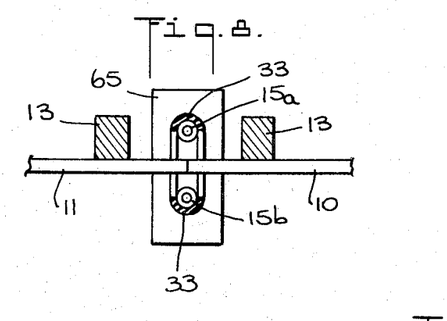
Figure 9:
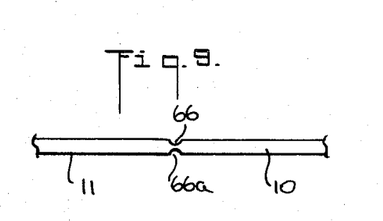

In FIG. 8, twin proximity conductors 15a and 15b, which are connected in parallel in accordance with the previous teachings of this invention, are disposed above and below the butted ends of plates 10 and 11. The forge welding operation will be as described with regard to FIG. 6 except that two dents 66 and 66a, FIG. 9, will be formed into the forge welded edges of plates 10 and 11.

In addition to the specific types of welds illustrated and described herein, various other types of welds may be formed in accordance with the present invention. Further examples may be seen by referring to my above-mentioned application Ser. No. 938, it being understood that by employing the teachings of the instant invention no mechanical hammer or moving anvil is required to provide forging pressure.

Figure 10:
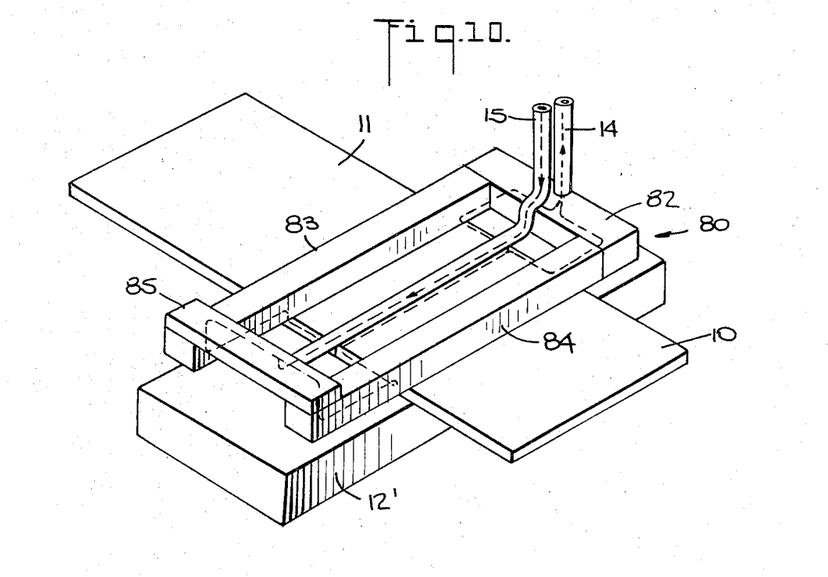
FIG. 10 is an illustration of an embodiment of the invention which is useful when employing an anvil which is a poor electrical conductor.

In the previously described embodiments that employed a fixed anvil, the conductors 14 and 15 were in conductive contact with the anvil. In some situations this may not be desirable. In FIG. 1, for example, the sheet 10 is forced against the top surface of the anvil 12. It may be desirable to make anvil 12 from a hard metal that will withstand repeated forming operations and which has poor electrical conductivity. Therefore, an arrangement such as illustrated in FIG. 10 is useful since current need not flow through the anvil 12'. The top ends of conductors 14 and 15 are connected to an electrical circuit such as illustrated in FIG. 1, and their opposite ends are connected to a metal framework 80 made of a good conductive material such as copper. Framework 80 extends across the conductive sheets 10 and 11 and holds the sheets on the top surface of anvil 12'.

Framework 80 is comprised of an end member 82 to which conductor 14 is conductively connected. Bars 83 and 84 extend transversely across the sheets 10 and 11 and are joined at their left ends by end member 85. Only bars 83 and 84 are in contact with the sheets 10 and 11.

Current from a pulse current source, and from a source of high frequency heating current flows through proximity conductor 15 and into end member 85. The current path then takes parallel branches to the left ends of bars 83 and 84. Due to proximity effect and skin effect, the current from the parallel branches in bars 83 and 84 then flows to narrow transverse portions of the sheets 10 and 11 which lie directly below proximity conductor 15. At the right side of the sheets 10 and 11 the current path again follows parallel branches in the right ends of bars 83 and 84, passes through block 82 to conductor 14, and then returns to the source.

Upon application to conductors 14 and 15 of the large magnitude current pulse having a fast rising leading edge, the simultaneously occurring pulse of magnetic pressure acts against the portions of the sheets 10 and 11 below proximity conductor 15 and forms a forge weld between the butting edges of the sheets 10 and 11 as described in connection with FIG. 6. It is seen that anvil 12' is virtually excluded from the current path so that its electrical conductivity is of no importance.

Figures 11, 12, 13, 14:
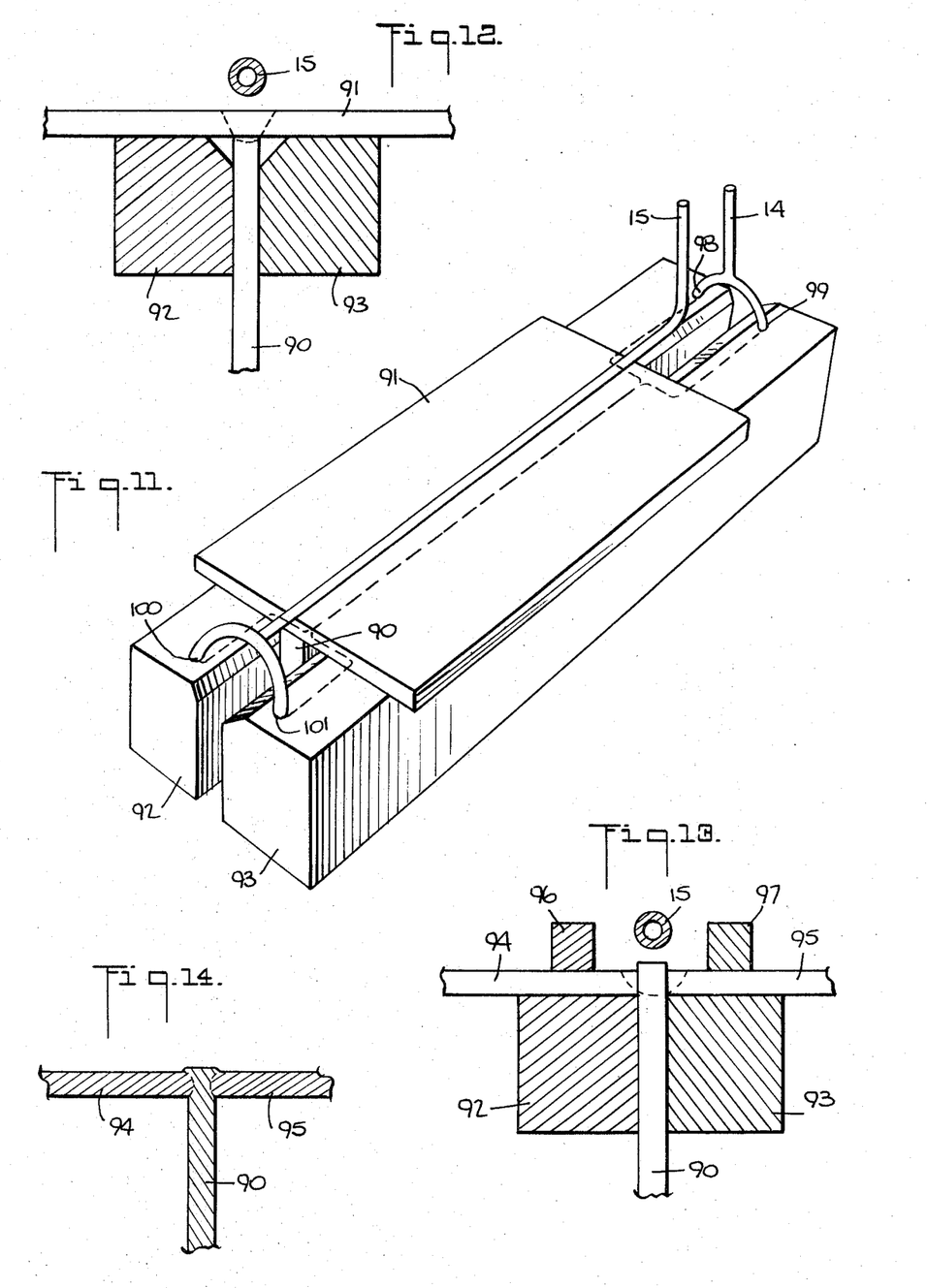
FIGS. 11-14 illustrate the use of the invention for making T-type welds.

The methods hereinbefore described may also be employed for producing a T-weld between a pair of members. As illustrated in FIGS. 11 and 12, a first plate 90 may be held with its edge surface against a surface of a plate 91 by means of a pair of conductive bars 92 and 93, such bars 92 and 93 being made, for example, of copper. The portion of the plate 91 immediately above the edge surface of the plate 90, as well as the edge portion of the plate 90, may be heated by passing an alternating current through the proximity conductor 15 and the plate 91 as described hereinbefore. Preferably, the current is of a frequency providing a reference depth in the metal of the plate 91 at least equal to the thickness of the plate 91, but it may be higher. Such current will heat the edge surface of the plate 90, and the metal of the plate 91 immediately thereabove, to forge welding temperature and after such temperature is reached, a current pulse is passed through the proximity conductor 15 and the plate 91 in the manner described hereinbefore, forcing the metal of the plate 91 immediately below the proximity conductor 15 against the end of the plate 90 and producing a forge weld therebetween.

Instead of a weld between the end surfaces of the plate 90 and another plate, as described in connection with FIGS. 11 and 12, a T-weld between the plate 90 and a pair of plates 94 and 95 may be produced by the apparatus illustrated in FIG. 11 arranged as illustrated in FIG. 13. Thus, as shown in FIG. 13, the end portion of the plate 90 is held between the end surfaces of the pair of plates 94 and 95 by the bars 92 and 93 and a further pair of bars 96 and 97. The end portion of the plate 90 and the adjacent portions of the plates 94 and 95 may be heated to forge welding temperature by passing an alternating current through the proximity conductor 15 and the end portions of the plates 90, 94 and 95 as described hereinbefore and, thereafter, the plates 91, 94 and 95 may be welded together at their end portions by passing a large magnitude current pulse through the same circuit that is used for producing the heating. After the passage of such large magnitude current pulse through such circuit, a weld of the type illustrated in FIG. 14 will be produced. Preferably, the frequency of the heating current is such as to have a reference depth in the metal of the plates 94 and 95 at least equal to the thickness thereof, although a higher frequency may be used.

It will be observed from an examination of FIG. 11 that the conductor 14 is connected to the bars 92 and 93 by a pair of contacts 98 and 99, and that the proximity conductor 15 is also connected to the bars 92 and 93 by a pair of contacts 100 and 101. Although such contacts are desirable in the apparatus illustrated in FIG. 11 in order to distribute the current properly in the parts being welded together, such contacts also have the advantage that the large currents required are substantially equally divided between the contacts thereby reducing the heating thereof and avoiding problems therewith. However, even if a pair of contacts are unnecessary for the reasons they are used in the embodiment shown in FIG. 11, the use of a pair of contacts for connecting the conductor 14 and the proximity conductor 15 to the work is desirable for the purpose of reducing the problems with the contacts.

Figure 15:
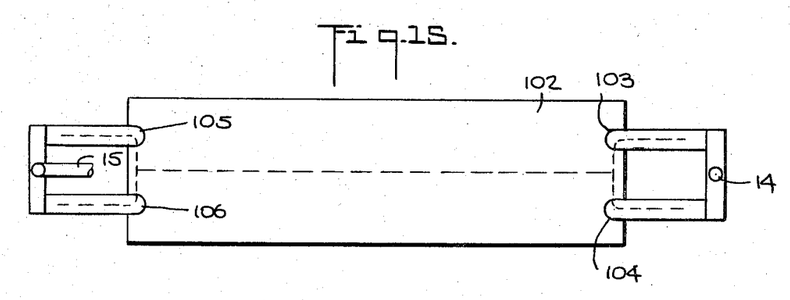
FIGS. 15 and 16 illustrate modifications of the contact portions of the apparatus shown in FIG. 1.

FIG. 15 illustrates a member 102, which may either be an anvil, such as the anvil 12 shown in FIG. 1, or a pair of parts to be welded together, such as the plates 10 and 11 shown in FIG. 6, to which the conductor 14 is electrically and conductively connected by a pair of contacts 103 and 104. The proximity conductor 15 is also connected to the member 102 by a pair of contacts 105 and 106.

Figure 16:
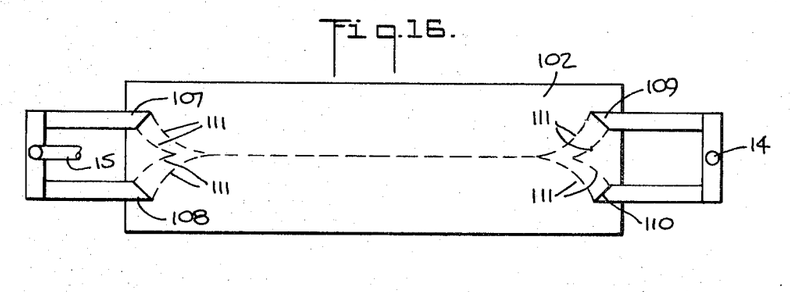

As illustrated in FIG. 16, the contacts may be tapered at their ends so as to reduce the current concentration in the member 102 at the portion thereof adjacent to the contacts. The contacts 107-110 shown in FIG. 16 are bevelled outwardly at their ends and away from each other so that the current will be spread out as indicated by the dotted lines 111 indicated in FIG. 16, thereby reducing the density of the current in the portions of the member 102 immediately adjacent the several contacts. Such reduction in density of the current is particularly desirable when the current is supplied to the anvil, such as the anvil 12 shown in FIG. 1.

Figures 17, 18, 19:
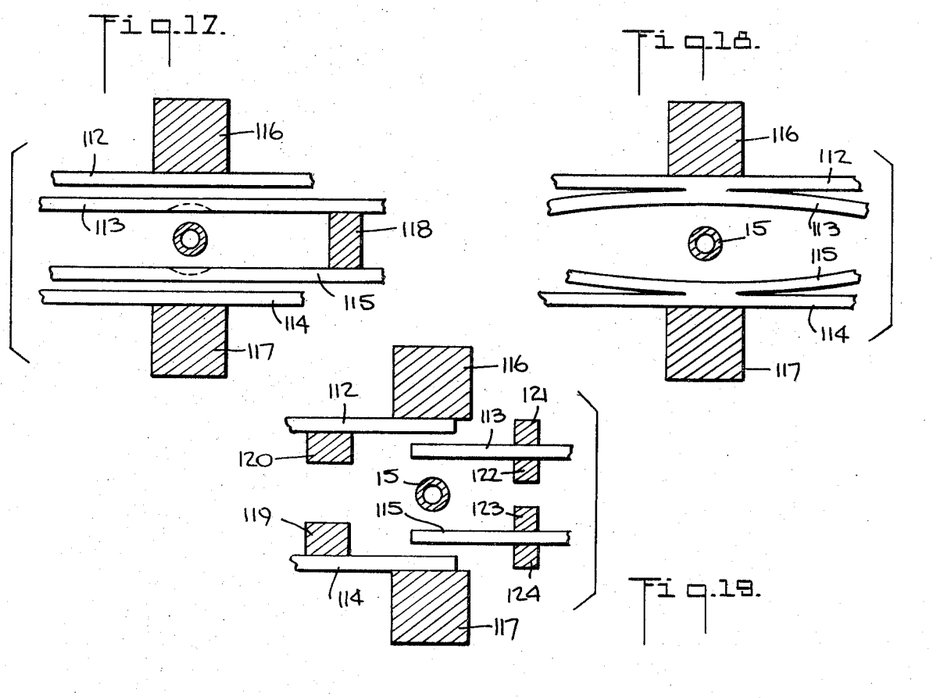
FIGS. 17-19 illustrate the use of a modified form of the invention for the simultaneous production of a pair of welds.

In the various preceding embodiments, it is necessary to support the proximity conductor 15 against movement away from the parts being welded together during the application of the large magnitude current pulse. With the arrangements illustrated in FIGS. 17-19, the forces on the proximity conductor 15 during the application of the current pulse are substantially oppositely directed and equal so that it is unnecessary to support the proximity conductor 15 during the application of the current pulse. FIGS. 17-19 also illustrate the application of the methods of the invention to the simultaneous welding of two pairs of parts. Although FIGS. 17 and 19 also illustrate the parts as seperated during the heating thereof, such parts may be in contact during the heating thereof.

FIG. 17 illustrates the application of the method of the invention to the simultaneous welding together of two pairs of plates 112 and 113 and 114 and 115 at intermediate portions thereof. The outer plates 112 and 114 are held against anvils 116 and 117 in any suitable manner, and the plates 113 and 115 are held in spaced relation to the plates 112 and 114 by any suitable means, such as the support 118. Heating current is supplied to the proximity conductor 15 and to the plates 113 and 115 in the manner described hereinbefore, namely, so that the current flows in one direction in the proximity conductor 15 and in the opposite direction in the portions of the plates 113 and 115 immediately adjacent to the proximity conductor 15.

After the portions of the plates 113 and 115 have reached the desired welding temperature they are forced, respectively, against the plates 112 and 114 by applying a large magnitude current pulse to the same circuit that is used for the heating current. Such current will cause the plates 113 and 115 to become welded to the plates 112 and 114 producing a weld of the type illustrated in FIG. 18.

In the embodiment illustrated in FIG. 17, the weld is produced between intermediate portions of the plates 112-115, but, if desired, lap welds may be produced between the end portions thereof as illustrated in FIG. 19. In FIG. 19, the end portion of the plate 114 is held against the anvil 117 by suitable means, such as the bat 119, and the end portion of the plate 112 is held against the anvil 116 by suitable means, such as the bar 120. Similarly, the end portion of the plate 113 is held in spaced relation to the end portion of the plate 112 and between the proximity conductor 15 and the plate 112 by suitable means, such as bars 121 and 122. The end portion of the plate 115 is held in spaced relation to the end portion of the plate 114 and between the proximity conductor 15 and the end portion of the plate 114 by suitable means, such as bars 123 and 124. Such end portions of the plates 112–115 are welded together in the manner described hereinbefore in connection with FIG. 17.

It will be noted that in the embodiments illustrated in FIGS. 17 and 19, current flows in the proximity conductor 15 and in only the portions of the plates 113 and 115 nearest thereto, and therefore, during the application of the heating current only the portions of the plates 113 and 115 nearest to the proximity conductor 15 will be heated prior to the application of the large magnitude current pulse. In other words, during the heating portion of the cycle of operation there is no current flow in the plates 112 and 114. However, with the application of a sufficiently large current pulse, a satisfactory forge weld may be produced between the adjacent plates, even though only one of them is heated during the heating cycle, and the forge welding may be accomplished with a pulse current of lower magnitude than would be necessary if there was no heating of the plates 113 and 115 prior to the application of the current pulse. If desired, for the purpose of producing heating in the portions of the plates 112 and 114 to be welded to the plates 113 and 115, the plate 113 may be in contact with the plate 112 and the plate 115 may be in contact with the plate 114 during the heating portion of the cycle and during the application of the pulse current. Also, if the heating current frequency is selected to provide a reference depth greater than the thickness of the plate 113 and the plate 115, at least some current will flow in the plates 112 and 114 when they are in contact with the plates 113 and 115.

In various ones of the drawings two electrically conductive sheets are illustrated as being worked upon, as by welding. In practice, the two illustrated members may be in fact the edge portions of a single member such as sheet of metal which has been formed into a tubular shape. The welding process described forms the weld that completes the tubular product which may be a can body or a pipe, as examples.

It is to be understood that the illustrated circuitry of the heating current source and the pulsed current source are but simplified representations. The courses of current, themselves, are not the subject of this invention. Any suitable circuitry may be utilized to supply the currents required in the practice of this invention.

Although only preferred embodiments of the invention have been described, it will be understood by those skilled in the art that various modifications may be made without departing from the principles of the invention.

What is claimed is:

1. Apparatus for forge welding together adjacent, coextensive portions of a pair of electrically conductive members comprising
    means for establishing a current path in at least one of said portions,
    elongated proximity conductor means disposed in closely spaced relationship to said portions,
    means establishing electrically conductive contact between one end of the proximity conductor means and one end of said current path in said one portion,
    a source of pulsed current,
    means for selectively connecting said source of pulse current between the other end of the current path in said one portion and the other end of the proximity conductor means,
    a source of alternating heating current for heating at least said one portion to an elevated forge welding temperature, and
    means for selectively connecting said source of heating current between the other end of the current path in said one portion and the other end of the proximity conductor means.

2. The apparatus claimed in claim 1 and further including
    an anvil in contact with the other of said portions.

3. The apparatus claimed in claim 2 wherein said anvil is electrically conductive and forms at least a part of the means for establishing conductive contact between said one end of the proximity conductor means and said one end of the current path in said one portion.

4. The apparatus claimed in claim 1 and further including
    means for establishing a current branch through the other of said portions,
    means for establishing electrically conductive contact between said one end of the proximity conductor means and one end of the current branch in said other portion, and
    means for establishing conductive electrical connection between the other end of current path in said one portion and the other end of the current branch in said other portion.

5. The apparatus claimed in claim 4 wherein said portions are in overlapping relationship.

6. The apparatus claimed in claim 4 wherein said portions are in butting relationship.

7. The apparatus claimed in claim 4 wherein said proximity conductor means comprises
    first and second proximity conductors disposed in spaced relationship, said portions of said pair of members being positioned between said proximity conductors.

8. The apparatus claimed in claim 1 wherein one of said portions is the end surface of one of said members and the other of said portions is an intermediate portion of a surface of the other of said members and further comprising means for holding said end surface against said intermediate portion with said one member on the opposite side of said other member from said proximity conductor means and with said end surface aligned with said proximity conductor means.

9. The apparatus claimed in claim 8 wherein said members are metal members and the frequency of the alternating heating current provides a reference depth in the metal of said other member at least equal to the thickness thereof intermediate said end surface and said proximity conductor means.

10. The apparatus claimed in claim 1 wherein one of said portions is the end surface of one of said members and the other of said portions is a surface portion of said other member adjacent an end thereof and further comprising a third conductive member having an end surface and means for holding said end surface of said one member against said surface portion of said other member, said end surface of said third member against a surface portion of said other member opposite and corresponding to said first-mentioned surface portion and the surface of said other member at said end thereof adjacent and aligned with said proximity conductor means.

11. The apparatus claimed in claim 1 further comprising relatively rigid means on opposite sides of and spaced from said proximity conductor means, said rigid means having surfaces aligned with said proximity conductor means, a further pair of electrically conductive members having adjacent co-extensive portions, means for holding said portions of said first-mentioned pair of member between said proximity conductor and one of said rigid means and for holding said portion of said second pair of members between said proximity conductor means and the other of said rigid means, means for establishing a further current path in at least one of the portions of said further pair of members, means for establishing electrically conductive contact between said one end of said proximity conductor means and the end of said further current path which is nearest said one end of said first-mentioned current path, means for connecting said source of pulse current between said other end of said proximity conductor means and the other end of said further current path and means for connecting said source of heating current between said other end of said proximity conductor means and said other end of said further current path.

12. The apparatus claimed in claim 1 wherein each of said means for establishing electrically conductive contact between one end of the proximity conductor means and one end of said current path and said means for connecting said source of pulse current between the other end of the current path and the other end of the proximity conductor means comprises a plurality of contacts, one plurality of contacts being at one end of said path and the other plurality of contact being at the other end of said path.

13. The apparatus claimed in claim 1 wherein each of said plurality of contacts have tapered ends which taper away from each other in the direction of said path with respect to said contacts.

* * * * *

UNITED STATES PATENT OFFICE
CERTIFICATE OF CORRECTION

Patent No. 3,851,139      Dated November 26, 1974

Inventor(s)   WALLACE C. RUDD

It is certified that error appears in the above-identified patent and that said Letters Patent are hereby corrected as shown below:

Col. 1, line 42 - after "known" insert --as--

Col. 2, line 59 - "direction" should read --directions--

Col. 6, line 44 - "bats" should read --bars--

Col. 9, line 49 - "91" should read --90--

Col. 11, line 6 - "bat" should read --bar--

Col. 13, line 24 - "member" should read --members--

Col. 14, line 21 - "contact" should read --contacts--

Signed and sealed this 21st day of January 1975.

(SEAL)
Attest:

McCOY M. GIBSON JR.
Attesting Officer

C. MARSHALL DANN
Commissioner of Patents